(12) United States Patent
Erickson et al.

(10) Patent No.: US 7,370,806 B2
(45) Date of Patent: May 13, 2008

(54) LABEL FOR AN ELECTRONIC PRODUCT THAT PROVIDES FAILURE INFORMATION WHEN THE PRODUCT FAILS

(75) Inventors: Steven C. Erickson, Rochester, MN (US); Ivory Wellman Knipfer, Rochester, MN (US); Jeffrey George Komatsu, Kasson, MN (US); Fraser Allan Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/532,971

(22) Filed: Sep. 19, 2006

(65) Prior Publication Data

US 2008/0067253 A1 Mar. 20, 2008

(51) Int. Cl.
*G06K 19/00* (2006.01)
*G06K 19/06* (2006.01)
*H04Q 5/22* (2006.01)
*G08B 13/14* (2006.01)

(52) U.S. Cl. ............... 235/487; 235/492; 235/385; 340/10.1; 340/572.1

(58) Field of Classification Search ........... 235/462.01, 235/487, 492, 385; 340/572.1, 5.92, 10.1, 340/519
See application file for complete search history.

(56) References Cited

U.S. PATENT DOCUMENTS

| | | | |
|---|---|---|---|
| 6,427,176 B1* | 7/2002 | Berglund et al. | 710/8 |
| 6,753,830 B2* | 6/2004 | Gelbman | 345/55 |
| 7,026,913 B2* | 4/2006 | Bhyravabhotla | 340/5.91 |
| 2002/0024323 A1* | 2/2002 | Fukushima et al. | 322/8 |
| 2002/0036802 A1* | 3/2002 | Tojo et al. | 358/1.16 |
| 2002/0065726 A1* | 5/2002 | Bhyravabhotla | 705/20 |
| 2002/0167500 A1* | 11/2002 | Gelbman | 345/204 |
| 2004/0002810 A1* | 1/2004 | Akuzawa et al. | 701/114 |
| 2004/0041749 A1* | 3/2004 | Dixon | 345/33 |
| 2004/0099735 A1* | 5/2004 | Neumark | 235/385 |
| 2004/0204780 A1* | 10/2004 | Boyer et al. | 700/83 |
| 2005/0134461 A1* | 6/2005 | Gelbman et al. | 340/572.8 |
| 2005/0152108 A1* | 7/2005 | Goel et al. | 361/683 |
| 2005/0204124 A1* | 9/2005 | Goodman et al. | 713/100 |
| 2005/0218218 A1* | 10/2005 | Koster | 235/383 |

(Continued)

OTHER PUBLICATIONS

Erickson, et al, U.S. Appl. No. 11/321,600, "Label for an Electronic Product that is Electronically Altered When the Electronic Product Changes", filed Dec. 29, 2005.

*Primary Examiner*—Daniel Walsh
(74) *Attorney, Agent, or Firm*—Martin & Associates, LLC; Derek P. Martin

(57) ABSTRACT

A label on an electronic product may be written electronically and maintains the last display state when power is removed from the label. There are many different types of digital paper and electronic paper known in the art that would be suitable for use as such labels. The label includes multiple defined regions that may be independently written, with one of the regions defined to display failure information for the electronic product. In one implementation, the failure information is available on the electronic product itself. In another implementation, the failure information includes information received from a source external to the electronic product. The display of failure information on the label may be in human-readable and/or machine-readable form. The result is a label on an electronic product that provides reliable information regarding a failure of the electronic product.

12 Claims, 6 Drawing Sheets

U.S. PATENT DOCUMENTS

| | | |
|---|---|---|
| 2005/0284933 A1* | 12/2005 | McGill .................. 235/383 |
| 2006/0064472 A1* | 3/2006 | Mirho .................. 709/220 |
| 2006/0080013 A1* | 4/2006 | Koenig et al. ............ 701/36 |
| 2006/0095647 A1* | 5/2006 | Battaglia et al. .......... 711/100 |
| 2006/0122887 A1* | 6/2006 | Bhyravabhotla ........... 705/20 |
| 2006/0154695 A1* | 7/2006 | Ishibashi ............... 455/558 |
| 2006/0169787 A1* | 8/2006 | Gelbman ................ 235/492 |
| 2006/0273162 A1* | 12/2006 | Andersson et al. ......... 235/383 |
| 2007/0001846 A1* | 1/2007 | August et al. ............ 340/571 |
| 2007/0022235 A1* | 1/2007 | Chen et al. ............... 710/62 |
| 2007/0075411 A1* | 4/2007 | Tanigawa et al. .......... 257/679 |
| 2007/0152045 A1* | 7/2007 | Erickson et al. ........... 235/385 |
| 2007/0188131 A1* | 8/2007 | Guthrie ................. 320/112 |

* cited by examiner

LABEL FOR AN ELECTRONIC PRODUCT THAT PROVIDES FAILURE INFORMATION WHEN THE PRODUCT FAILS

BACKGROUND

1. Technical Field

This invention generally relates to detecting failures in electronic products, and more specifically relates to ways of indicating failures of an electronic product.

2. Background Art

Failures in an electronic product may be difficult to diagnose. When a product fails, a technician typically performs some action to diagnose the failure, and the failed product may then be tested further after it is returned. Current methods for documenting failures use either paper that is attached to a failed electronic product, or send failure information to a database which can then be retrieved later as needed. Both of these methods suffer from potential human errors caused by the technician that diagnoses the problem entering incorrect or incomplete information, and may require the technician that receives the paper or database failure information to perform further tests or to perform data mining and analysis of the failure information. Without a way to automate the process of identifying failed parts and acting on the failure information, the electronics industry will continue to suffer the drawbacks of known inefficient and error-prone methods for documenting failure of an electronic product.

BRIEF SUMMARY

A label on an electronic product may be written electronically and maintains the last display state when power is removed from the label. There are many different types of digital paper and electronic paper known in the art that would be suitable for use as such labels. These are thin plastic films that allow the display of information in a non-volatile manner such that the display state remains when power is removed. The label includes multiple defined regions that may be independently written, with one of the regions defined to display failure information for the electronic product. In one implementation, the failure information is available on the electronic product itself. In another implementation, the failure information includes information received from a source external to the electronic product. The display of failure information on the label may be in human-readable and/or machine-readable form. The result is a label on an electronic product that provides reliable information regarding a failure of the electronic product.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 8:
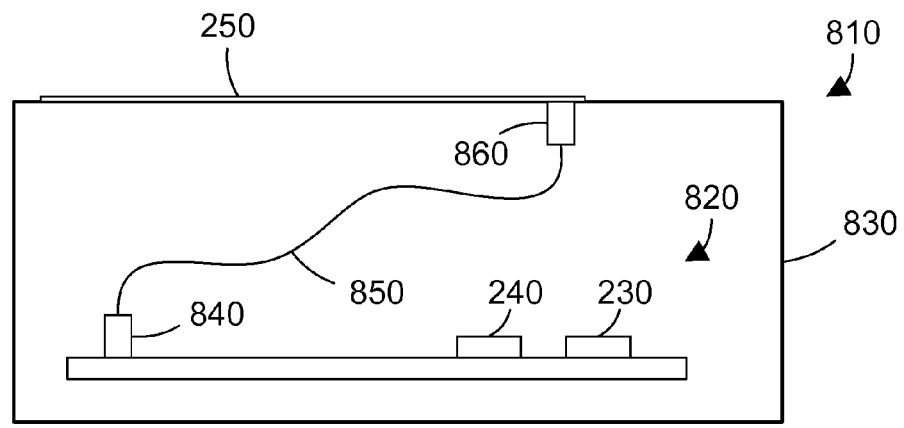
Figure 9:
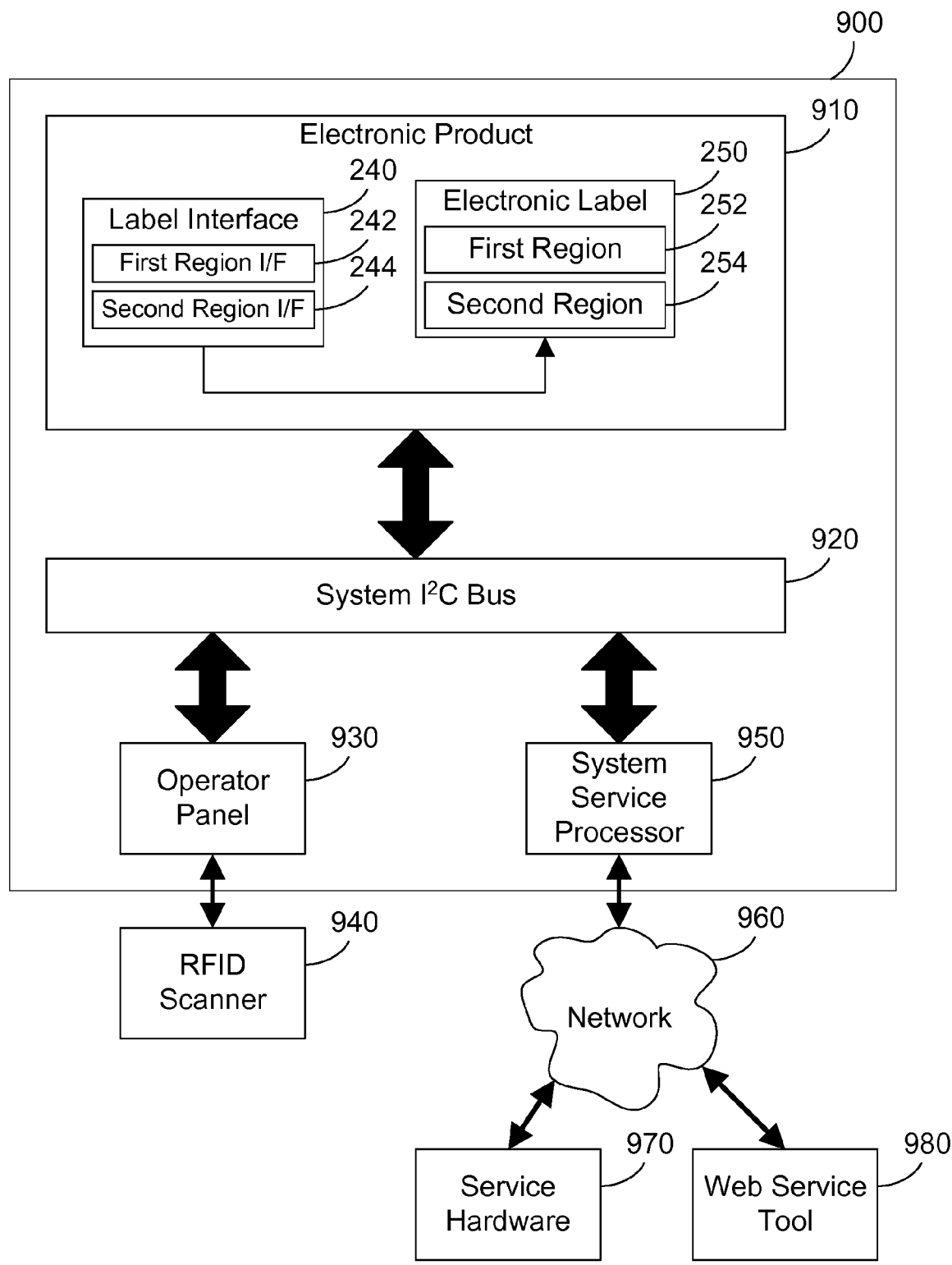
Figure 10:
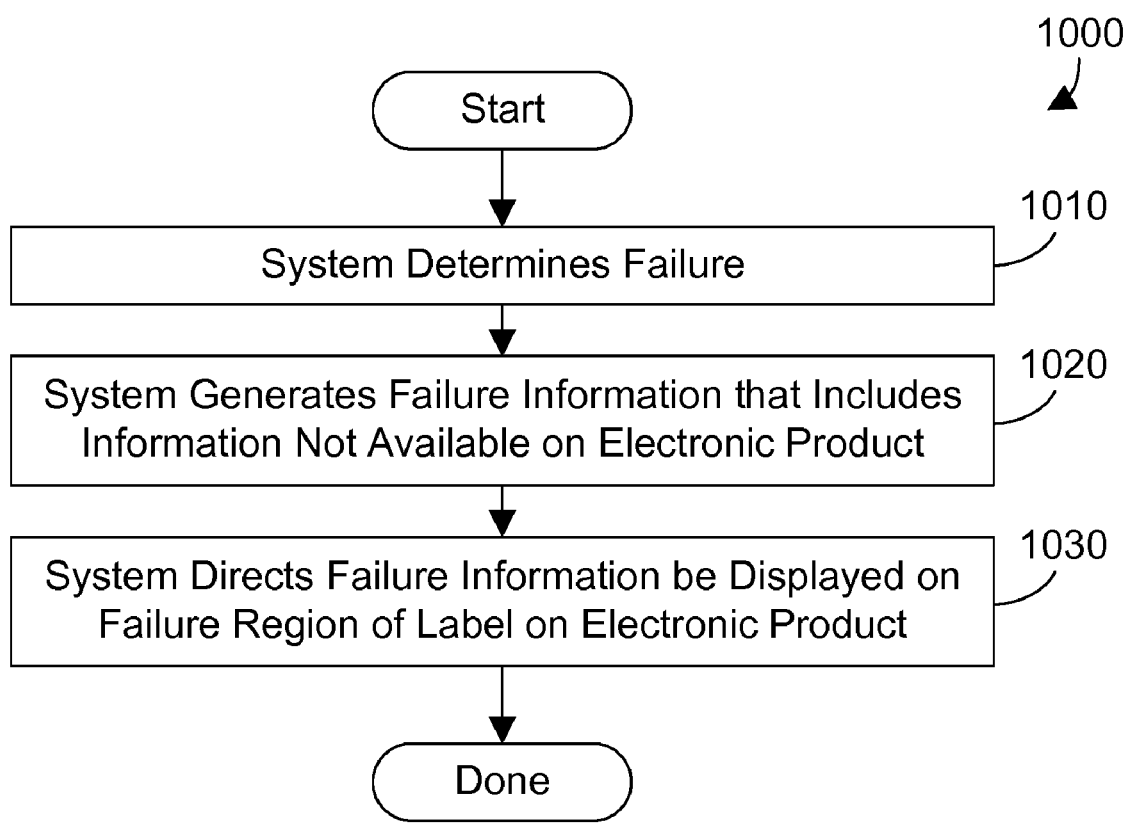

FIG. 8 is a cross-sectional view of an electronic product that includes an enclosure 830 with an electronic label 250 on the enclosure 830;

FIG. 9 is a block diagram of a sample system that allows gathering failure information that is not available from the electronic product itself and displaying this failure information on the electronic product; and FIG. 10 is a flow diagram of a method for the sample system in FIG. 9 to display information that is not available on the electronic product on the failure region of the electronic label on the electronic product.

DETAILED DESCRIPTION

1.0 Overview

The preferred embodiments relate to documenting a failure of an electronic product. For those not familiar with current practices for documenting failures for electronic products, this overview section will help to understand the present invention.

Known Method for Documenting Failures for Electronic Products

Figure 1:
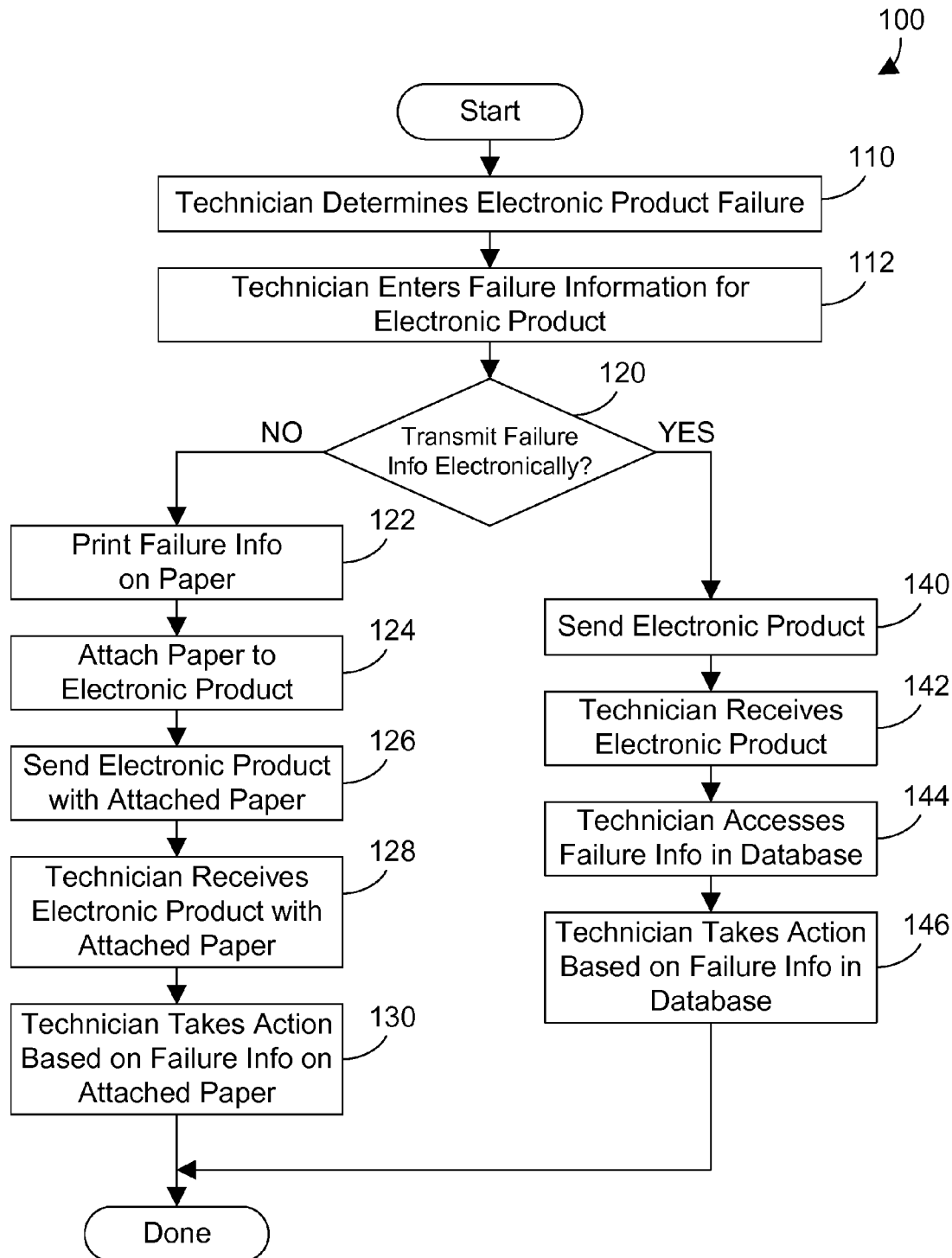
FIG. 1 is a flow diagram of a prior art method for detecting failure of a failed electronic product.

An example prior art method 100 in FIG. 1 is performed when an electronic product fails. When an electronic product fails, a technician typically determines that the electronic product failed (step 110). The technician may use any suitable tool, hardware and/or software, to detect the failure. The technician then enters failure information for the electronic product (step 112). This failure information is typically information entered into a computer system such as a laptop computer or a handheld computer. If the technician has a way to transmit the failure information electronically, it is transmitted (step 120=YES). The electronic product is then sent for further processing (step 140). A technician then receives the electronic product that was sent (step 142). The technician accesses the failure information in the database (step 144), and takes action based on the failure information in the database (step 146).

In many cases the technician has no way to transmit the failure information (step 120=NO). In this case, the failure information for the failed electronic product is printed on paper (step 122). The paper is then attached to the electronic product (step 124), and the electronic product and attached paper are sent for further processing (step 126). A technician receives the electronic product with the attached paper (step 128), and takes action based on the failure information on the attached paper (step 130).

There are several problems with the prior art methods for handling a failure of an electronic product. The technician determines the failure in step 110. The step of diagnosing the failure is thus prone to human errors. The technician enters the failure information for the electronic product in step 112. The technician may enter incorrect or incomplete information, which may require further testing of the failed electronic product. Step 112 is thus prone to human errors as well. For the case of failure information on paper in steps 122-130, the paper can be damaged or misplaced. In addition, the paper may be a source of electro-static energy that can damage sensitive electronic components. For the case of failure information stored in a database in steps 140-146, the technician that accesses the failure information in step 144 may have to use advanced data mining skills to correlate the failure information, which requires a specialized skill set and is time-consuming.

2.0 Detailed Description

An electronic product includes a label that has a defined failure region in addition to one or more other regions. The label may be written electronically, and may include information in both human-readable and machine-readable form. In one implementation, failure information that is available on an electronic product is written to the failure region of the label when a failure is detected by the electronic product. In another implementation, failure information that is not available on the electronic product is received from an external source and is written to the failure region of the label. A failed product may thus display any suitable failure information on its label.

Figure 2:
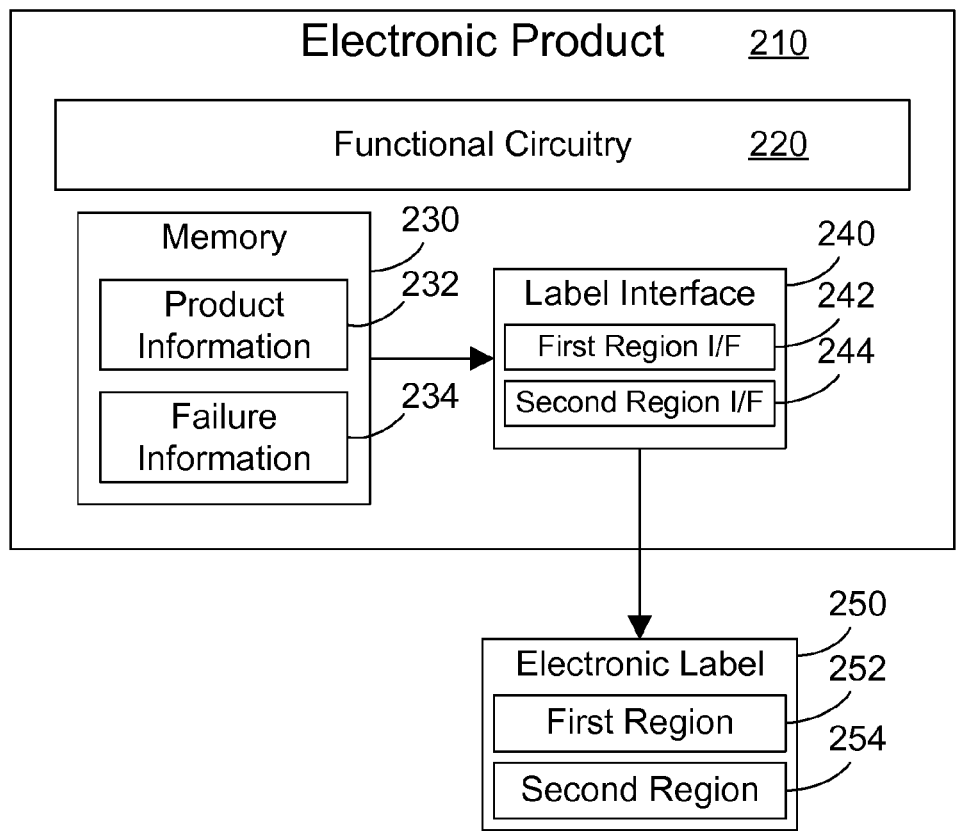
FIG. 2 is a simplified block diagram of an electronic product that writes failure information to a specified region of an electronic label.

Referring to FIG. 2, an electronic product 210 includes functional circuitry 220 that defines the function of the electronic product. For example, functional circuitry 220 for a network interface card might include a network interface chipset. The electronic product 210 also includes a memory 230 that stores product information 232 and failure information 234. Memory 230 is preferably non-volatile memory. Product information 232 may be any information relating to the electronic product 210. Vital product data (VPD) is known in the art as one suitable type of product information 232. Failure information 234 may include any suitable information that may pertain to a failure. Examples of failure information that might be useful include: date and time of failure; machine type and model of parent system that the electronic product came from; system serial number that the electronic product came from; hours of operation for the electronic product before the failure was reported; one or more codes that indicate the cause of the failure; whether multiple failures of the electronic product have occurred; register data, if available; information regarding whether the electronic product may be reworked to overcome the failure; whether other electronic products have also failed; system characteristics at the point of failure, such as voltage, frequency, temperature, etc.; configuration information, such as where the electronic product was installed when it failed, etc. A label interface 240 is coupled to the memory 230 and to an electronic label 250. The label interface 240 includes a first region interface 242 and a second region interface 244. Each of these interfaces 242 and 244 independently drive the first region 252 and second region 254 on the electronic label 250. In this manner, the two display regions of the electronic label 250 may be independently updated as required.

The first region interface 242 monitors the product information 232 in the memory 230, and each time the product information 232 changes, the first region interface 242 writes information corresponding to the product information to the first region 252 of the electronic label 250. In this manner, a change to the product information 232 is automatically reflected in the first region 252 of the electronic label 250. The second region interface 244 monitors the failure information 234 in the memory 230, and each time the failure information 234 changes, the second region interface 244 writes information corresponding to the product information to the second region 254 of the electronic label 250. In this manner, a change to the failure information 234 is automatically reflected in the second region 254 on the electronic label 250.

IBM uses the terminology "field replaceable unit" (FRU) to reflect any electronic product (or part) that may be easily replaced in the field. Cards that reside in card slots on a motherboard are good examples of FRUs, but the term FRU applies to any and all field-replaceable items. Note that electronic product 210 in FIG. 2 includes IBM FRUs as well as any other suitable electronic product. The electronic label 250 may be used on any type of electronic product, so long as memory 230 includes failure information 234 that may be written by the label interface 240 to a defined region 254 of the electronic label.

Electronic label 250 is any suitable media that can be electronically written, and that maintains the current state of the displayed information when power is removed, whether currently known or developed in the future. Examples of suitable media include electronic ink and electrochromic polymers. Electronic ink typically provides microcapsules that contain positively charged particles of one color and negatively charged particles of a different, contrasting color. The capsules are aligned using an electric field to display the desired color. Electrochromic polymers produces a color change in a persistent but reversible manner by means of an electrochemical reaction. Both electronic ink and electrochromic polymers have been used as "electronic paper." The label interface 240 preferably provides power to the electronic label 250. This allows the label interface 240 to write to the label 250 anytime the label interface 240 is active and detects a change in the product information 232 or failure information 234.

Figure 3:
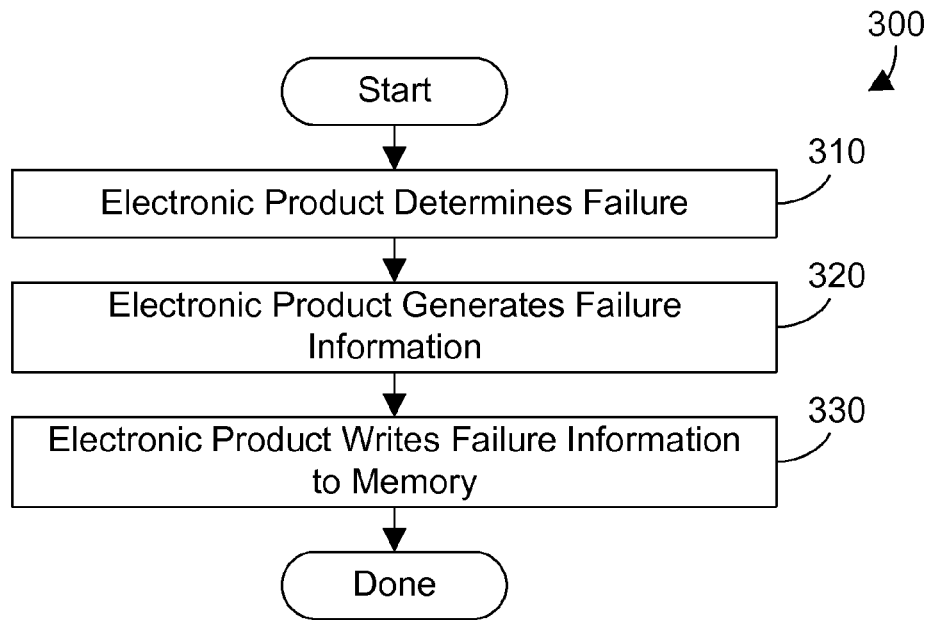
FIG. 3 is a flow diagram of a method for an electronic product to detect a failure and display corresponding failure information on an electronic label on the electronic product.

Referring to FIG. 3, a method 300 shows how the electronic product stores failure information. When the electronic product determines a failure occurred (step 310), the electronic product generates failure information that describes the failure (step 320). The electronic product then writes the failure information to memory (step 330). The electronic product thus performs continuous or periodic built-in self-tests to determine whether a failure has occurred, and when it detects a failure, the failure information that reflects the failure is written to the memory. When the label interface 240 detects a change in the failure information 234, the second region interface 244 writes data corresponding to the changed failure information to the second region 254 of the electronic label 250, as described below with reference to FIG. 5.

Figure 4:
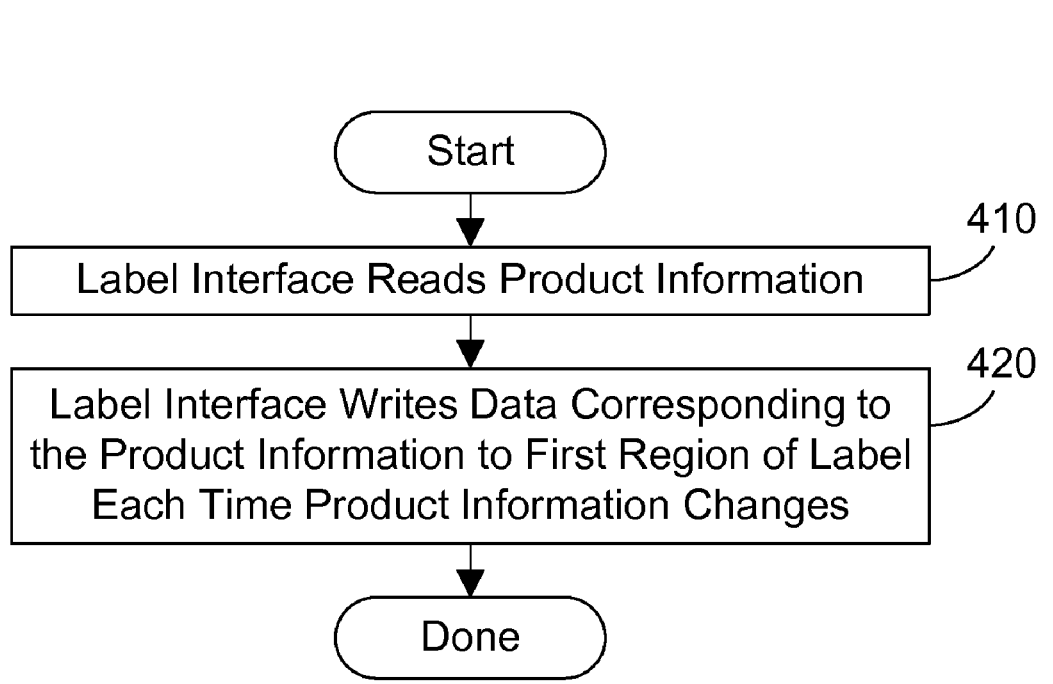
FIG. 4 is a flow diagram of a method for an electronic product to dynamically change product information in a first region of a label when the product information changes.

Referring to FIG. 4, a method 400 shows how the label is dynamically changed as the product information is updated. The first region interface 242 reads the product information (step 410). The first region interface 242 writes data corresponding to the product information to the label each time the product information changes (step 420). Note that the product information read in step 410 may not be the exact information written in step 420. Known forms of digital and electronic paper may be written to electronically as a grid of display elements. The information written in step 420 certainly reflects the product information to the view of a human reader and/or in machine-readable form, but this product information read in step 410 will typically have to be converted to a bitmap to be displayed on the electronic label. As a result, the information written to the label may be the product information, or may be information in a graphical format that corresponds to the product information, depending on how the electronic label is formatted and the interface for writing to the electronic label. In addition, the label interface 240 may include a table that correlates product information to corresponding information to be displayed. Thus, the label interface 240 may read updated product information from the memory 230, find an entry in its internal table for the updated product information, and display corresponding information on the electronic label. The preferred embodiments expressly extend to the display of any suitable information on the first region of the label that correspond to the product information in some way.

Figure 5:
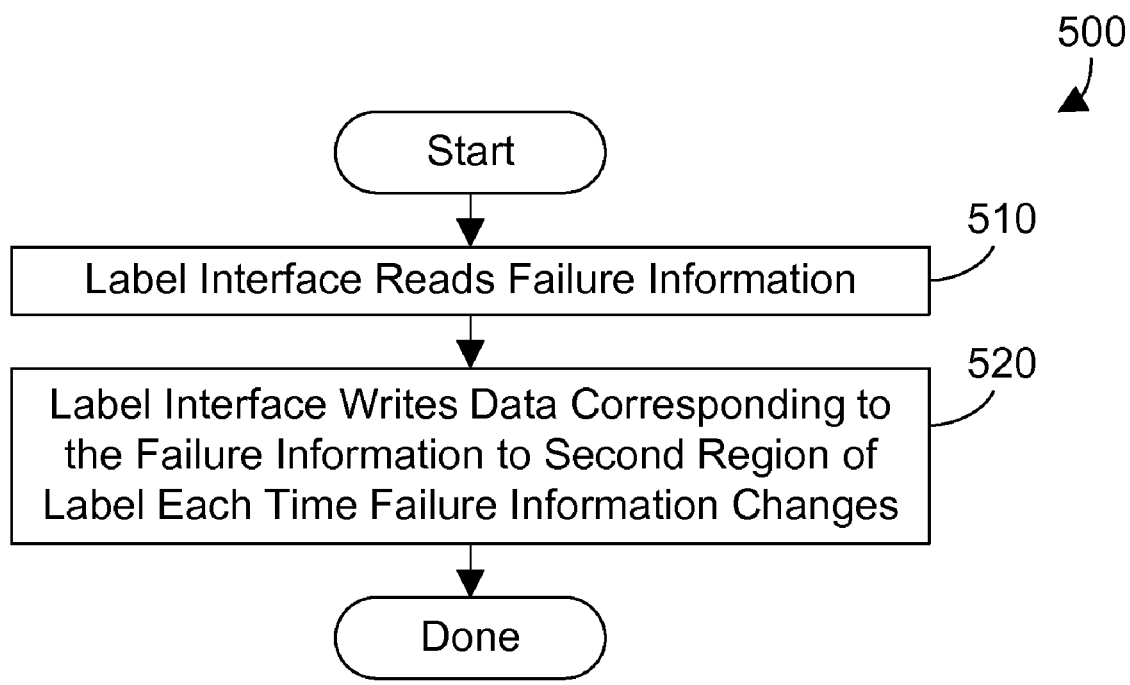
FIG. 5 is a flow diagram of a method for an electronic product to dynamically change failure information in a second region of a label when a failure occurs.

Referring to FIG. 5, a method 500 shows how the label is dynamically changed as failure information is updated. Note that the first region 252 and second region 254 of the electronic label 250 shown in FIG. 2 may be independently updated, which means one may be written without affecting what is displayed on the other. The second region interface 244 reads the failure information 234 in the memory 230 (step 510). The second region interface 244 then writes data corresponding to the failure information to the second region 254 of the electronic label 250 each time the failure information changes (step 520). Note that methods 400 and 500 in FIGS. 4 and 5, respectively, may run independently and asynchronously to each other, or may be synchronized to run at the same time or in a defined sequence each time they are run.

The information that the label interface writes to the electronic label includes a human-readable form of information, and may optionally include a machine-readable form of information such as a barcode. Barcodes are still in widespread use for tracking parts and assemblies. The human-readable information on the electronic label 250 allows a human service person to visually read product and failure information corresponding to the electronic product. The machine-readable information on the electronic label 250 allows easy inventory tracking of the electronic product and automated entry of failure information for the product into a database. Note that radio frequency identification (RFID) is becoming more and more popular, and will likely replace barcodes as the preferred way of tracking things. Even if RFID is used on an electronic assembly, there is still a need for a human-readable label so a quality assurance person can verify proper assembly and so a service person can determine the configuration and failure information for a failed product.

Figure 6:
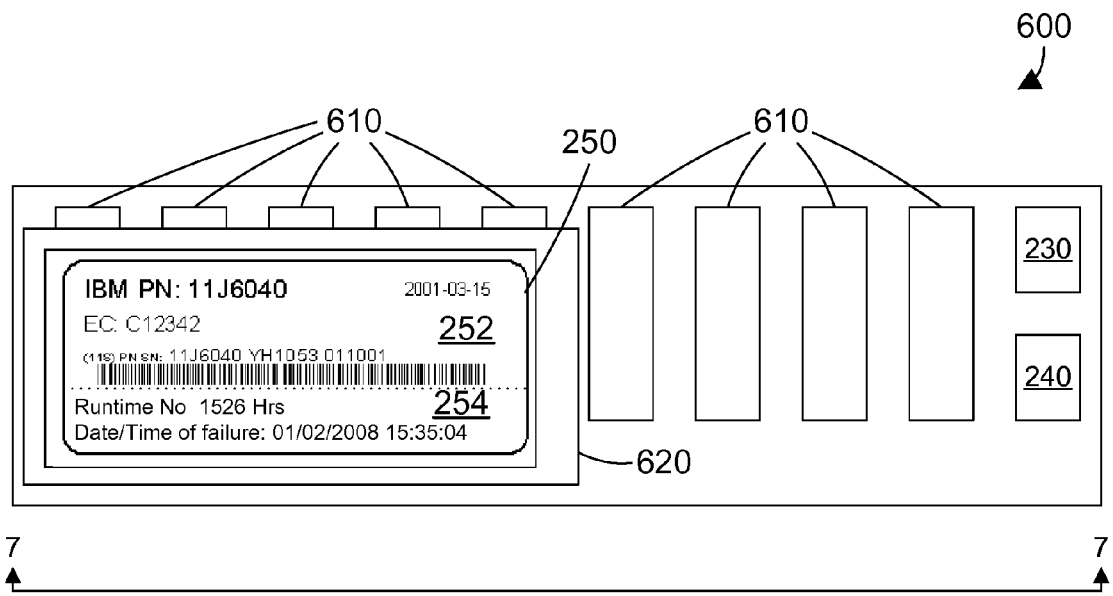
FIG. 6 is a top view of an electronic label with two independent regions on a memory module.

A simple example is now presented to illustrate the concepts of the preferred embodiments. Referring to FIG. 6, a memory DIMM 600 is one suitable example of the electronic product 210 in FIG. 2. The memory DIMM 600 includes memory chips 610, a memory 230 that holds the product information and failure information, and the label interface 240. The electronic label 250 is attached to a substrate 620, shown more clearly in FIG. 7, which provides structural support for the label 250. The electronic label 250 preferably displays a human-readable form of product information, such as the IBM part number, 11J6040 shown in region 252 in FIG. 6. The label 250 may optionally include a machine-readable form of information, such as the barcode shown in FIG. 6. Note that label 250 in FIG. 6 is divided into two independent regions 252 and 254, with region 252 displaying product information and region 254 displaying failure information. The two regions 252 and 254 in FIG. 6 are shown separated by a dotted line to indicate these regions are independent from each other, and therefore one can be written without affecting the information displayed on the other. Region 254 in FIG. 6 shows the hours of operation and the date/time of the failure.

Figure 7:
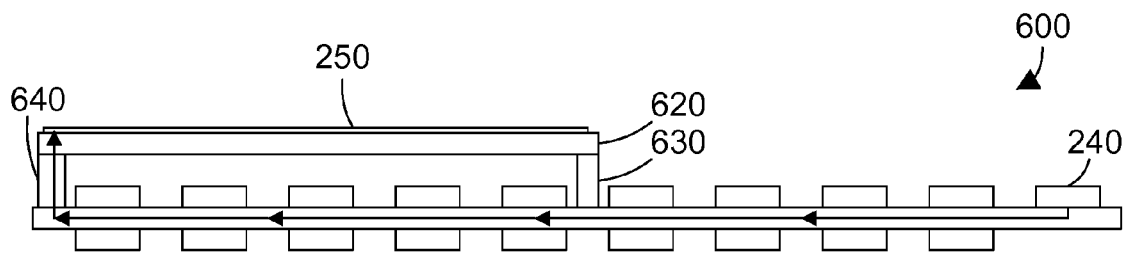
FIG. 7 is a side view of the memory module in FIG. 6 taken along the line 7-7.

Referring to FIG. 7, the substrate 620 is supported by support 630 and connector 640. Connector 640 provides electrical contact between the board on which the label interface 240 is mounted and the electronic label 250. Label interface 240 may thus drive the electronic label 250 via signal lines in the board, as shown by the line with arrows in FIG. 7. The result is a memory DIMM 600 that includes an electronic label 250 with a first region 252 that is automatically updated anytime the product information in the memory DIMM 600 indicates a change to the electronic product and a second region 254 that is automatically updated anytime the failure information in the memory DIMM 600 indicates a failure.

Note that some electronic products have physical enclosures, and the preferred embodiments herein extend to the placement of an electronic label on a physical enclosure, as shown in the cutaway view of FIG. 8. We assume an electronic product 810 is an example of the electronic product 210 in FIG. 2. We further assume the electronic product 810 includes an electronic assembly 820 that includes the memory 230 that contains the product information (232 in FIG. 2) and the failure information (234 in FIG. 2). Electronic assembly 820 also includes the label interface 240, and electronic assembly 820 is housed in an enclosure 830. The label interface 240 is electrically coupled to a connector 840, which is connected via a suitable cable (such as a ribbon cable) to a connector 860 that makes electrical contact with the electronic label 250 on the outside of the enclosure 830. In this manner, the product or failure information for the electronic product 810 may be updated, and the update will be automatically reflected on the appropriate region of the electronic label 250 on the outside of the enclosure 830. Note also that a single label on an enclosure could display failure information for multiple electronic products in the enclosure. For example, a personal computer (PC) could have an external label that shows failure information for all of the electronic products in the PC, thereby allowing a technician to very quickly locate the failed electronic product when the computer system fails.

The term "product information" specifically includes vital product data (VPD) as is known in the art, but may include additional information as well. The term "failure information" may include any suitable information that may be displayed, both human-readable and machine-readable, that may help to document a failure.

Method 300 in FIG. 3 assumes the failure information is determined by the electronic product itself. In an alternative implementation, the failure information may include information received from a source external to the electronic product. An example is now presented to illustrate. Referring to FIG. 9, a computer system 900 includes various parts, and is also coupled to external devices. We assume that electronic product 910 is a specific example of an electronic product 210 in FIG. 2, such as a DIMM module 600 shown in FIG. 6. Note that functional circuitry in electronic product 910 is not shown in FIG. 9 for the sake of clarity, but is understood to be present. Electronic product 910 includes a label interface 240 which includes a first region interface 242 and a second region interface 244 that drive first region 252 and second region 254, respectively, of electronic label 250. The electronic product 910 is coupled to a system bus 920, shown in FIG. 9 as an Inter-Integrated Circuit (I²C) bus. An operator panel 930 may optionally be coupled to the system bus 920, and an input/output device such as an RFID scanner 940 could be used to exchange information with the operator panel 930. In addition, a system service processor 950 may be coupled to the system bus 920 to allow diagnostic and other system services to be run on the electronic product 910 and on other electronic products in computer system 900. The system service processor 950 may be coupled via a network 960 to service hardware 970 or to a web service software tool 980. Service hardware 970 may include any suitable hardware that may be used to perform service or run diagnostics on computer system 900. Web service tool 980 is a software tool that allows a technician to remotely perform service or run diagnostics on computer system 900.

Note that any of items 930, 940, 950, 970 and 980 in FIG. 9 may be input devices that can be a source of failure information external to the electronic product 910 that is displayed in the second region 254 of the electronic label 250. In addition, the system service processor 950 can also be a system interface that electrically connects all possible input devices to label interfaces (e.g., 240 in electronic product 910 in FIG. 9). The system bus 920 is what links all electronic products in the computer system 900.

Any input device may request that failure information be gathered and displayed in the second region 254 of the electronic label 250. This failure information may include information from the electronic product itself, and may also include information from a source external to the electronic product. For example, a memory DIMM such as 600 shown in FIG. 6 typically does not include a real-time clock. If the date and time of failure needs to be recorded, the system service processor 950 could include in the failure information the date and time of the failure from a real-time clock source that is external to the electronic product. An electronic product may not monitor its own runtime hours of operation, but the system service processor 950 could monitor runtime hours for all electronic products in computer system 900. In addition, the failure information could include information for a different electronic product. For example, if a label on a first DIMM can be easily read by a technician but the label on a second DIMM is blocked from view by the first DIMM, failure information for the second DIMM could be displayed on the electronic label of the first DIMM so the technician can readily determine that the second DIMM has failed without having to pull the second DIMM from its socket to read its label. The disclosure and claims herein expressly extend to the display of any suitable failure information on a region of an electronic label that has multiple independent regions, where the failure information may include information completely contained or derived within the electronic product, may include information that is received from a source external to the electronic product, and may include a combination of internal and external failure information.

Referring to FIG. 10, a method 1000 shows steps that could be performed by computer system 900 in FIG. 9. First, the system determines a failure occurred (step 1010). The system then generates failure information that includes information not available on the electronic product (step 1020). The system then directs the failure information be displayed on the failure region of the electronic label on the electronic product (step 1030). In this manner information external to an electronic product regarding a failure may be displayed on the electronic label for the electronic product.

In the description above, the label interface monitors failure information, and write data corresponding to the failure information to the failure region of an electronic label when the failure information changes. Note, however, that the determination of what failure information to write or when to write it could be made using any suitable heuristic or criteria. For example, failure information could be ranked according to the severity of the failure, which would prevent low-priority failure information from overwriting higher-priority failure information. Failure information could also be cumulative, simply tacking on new failure information to existing failure information. The disclosure and claims herein expressly extend to any method for writing data corresponding to failure information to a failure region of an electronic label that includes multiple regions that may be independently written.

Note that the failure information displayed in the failure region of the electronic label may include machine-readable information. This would allow for the failure information to be stored in a database under a unique identifier. The unique identifier may then be displayed in machine-readable form. By reading the identifier using a suitable reader, the corresponding failure information in the database may be retrieved. This is a significant improvement over prior art method 100 in FIG. 1 because the steps of determining the cause of the product failure and entering failure information for the electronic product are performed automatically without human intervention. By displaying the machine-readable identifier, the corresponding machine-generated failure information may be retrieved from the database without the worry of the failure information being incorrect or incomplete, and without requiring the technician to be skilled in data mining.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A method for displaying failure information for an electronic product, the method comprising the steps of:
   (A) the electronic product determining a failure in the electronic product;
   (B) the electronic product generating failure information comprising first information corresponding to the failure determined in step (A) and second information not available on the electronic product, generated by and received from a source external to the electronic product in response to determining a failure has occurred;
   (C) the electronic product writing to a memory on the electronic product the failure information for the electronic product generated in step (B);
   (D) reading the failure information from the memory; and
   (E) electronically writing data corresponding to the failure information to a first region of a label for the electronic product, the label displaying information electronically written to the label and maintaining a current display of information when power is removed from the label, the label comprising a plurality of regions that may be independently written, the plurality of regions including the first region.

2. The method of claim 1 wherein the data displayed in the first region of the label includes machine-readable data.

3. The method of claim 1 wherein the data displayed in the first region of the label includes human-readable data.

4. The method of claim 1 wherein the plurality of regions on the label comprise a second region that includes product information for the electronic pocket.

5. A method for displaying failure information for an electronic product, the method comprising the steps of:

generating failure information comprising first information generated by the electronic product in response to the electronic product determining a failure in the electronic product and second information not available on the electronic product, generated by and received from a source external to the electronic product in response to determining a failure has occurred; and electronically writing data corresponding to the failure information to a first region of a label for the electronic product, the label displaying information electronically written to the label and maintaining a current display of information when power is removed from the label, the label comprising a plurality of regions that may be independently written, the plurality of regions including the first region.

6. The method of claim 5 wherein the data displayed in the first region of the label includes machine-readable data.

7. The method of claim 5 wherein the data displayed in the first region of the label includes human-readable data.

8. The method of claim 5 wherein the plurality of regions on the label comprise a second region that includes product information for the electronic product.

9. The method of claim 1 wherein the second information comprises a date and time.

10. The method of claim 1 wherein the second information comprises runtime hours.

11. The method of claim 5 wherein the second information comprises a date and time.

12. The method of claim 5 wherein the second information comprises runtime hours.

* * * * *